Figure 1:
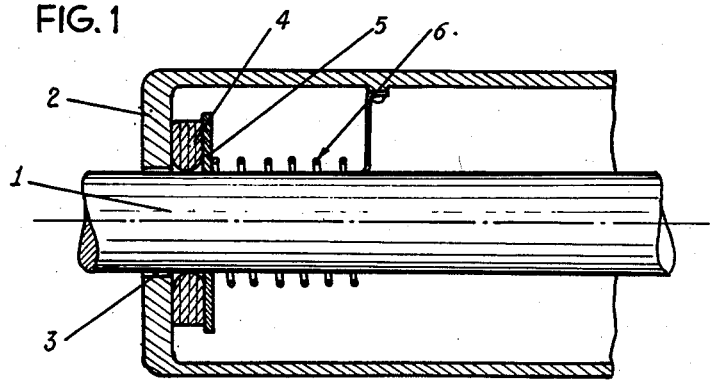

May 8, 1951 P. S. BALDWIN 2,552,391
SHAFT PACKING
Filed July 24, 1947

Inventor:
Philip S. Baldwin,
Max Ball,
Attorney

Patented May 8, 1951

2,552,391

UNITED STATES PATENT OFFICE 2,552,391

SHAFT PACKING

Philip Sidney Baldwin, Florence, Italy

Application July 24, 1947, Serial No. 763,370
In Italy June 27, 1945

Section 1, Public Law 690, August 8, 1946
Patent expires June 27, 1965

3 Claims. (Cl. 286—26)

This invention relates to a packing, more particularly suitable for shafts performing an axial motion, comprising a packing ring of resilient material, which is automatically subjected to an axial pressure and to a radial pressure acting from the periphery towards the center, by effect of the pressure existing within the body through which the shaft extends, the packing being fitted at the bore in said body.

A spring maintains a certain axial pressure on the packing, pressing it against the inner wall of the body, so as to cause it to expand sufficiently to remain in tight contact with the shaft, even when there is no or almost no internal hydraulic pressure in the body.

The packing ring is generally made in construction with a bore of a size such that light contact with the shaft results from assembly.

According to this invention, said bore is formed with a revolution surface having a curvilinear generatrix, so that contact with the shaft on assembly is practically limited to a circualr line in a substantially middle region.

On increase of pressure within the body through which the shaft extends, the packing ring is deformed and, under the radial thrust directed towards the centre, it is pressed against the shaft by an extent proportional to the rise in pressure.

On account of the above described form of the surface of the bore in the packing, the pressure within the body through which the shaft extends, also acts between the shaft and packing up to about half-width of the bore in the latter, that is up to the line of contact with the shaft, preventing a deformation which might bring the said bore portion in contact with the shaft, while said deformation takes place in the other bore portion towards the outside. This ensures a tight seal by virtue of the pressure contact of the resilient packing with the shaft under a pressure proportional to the pressure existing within the body traversed by the shaft, the friction zone between the packing and shaft being merely limited to about half the ring thickness.

Since the fluid pressure acts on the packing according to this invention both radially towards the shaft and axially, a permanent deformation of the packing even under high lasting pressures is prevented. In fact, the axial pressure tends to compress the rings axially and expand them radially, while the radial pressure tends to compress them radially and expands them axially, so that the two pressures counteract each other. Should the resilient rings be compressed in one direction only, for instance in an axial direction, they would tend to deform permanently under a high lasting pressure owing to the displacement of the resilient material which would permanently fill all empty spaces between the resilient periphery of the bore and the cylindrical surface of the axially moved shaft.

The accompanying drawing shows diagrammatically by way of example a construction of my improved packing for shafts moved axially through a bore in a body having a fluid pressure acting therein.

Figure 2:
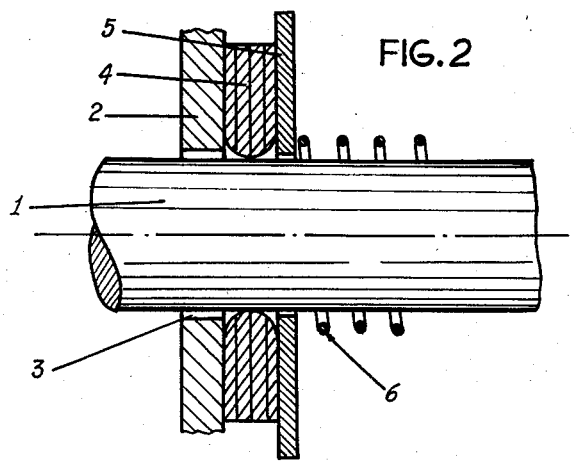
Figure 3:
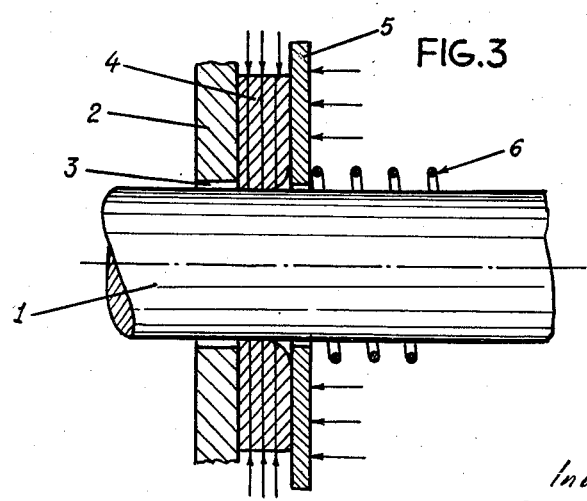

Figure 1 is an axial section of the device mounted in the pressure fluid body traversed by the axially moved shaft; Figures 2 and 3 show on an enlarged scale the ring of resilient material as it behaves when there is no pressure or a high pressure, respectively, in the body traversed by the shaft.

I denotes the shaft moved axially through a bore 3 in a hollow body or cylinder 2 within which a fluid pressure may be set up. A packing ring 4 of resilient material is fitted on the shaft I and is mounted within the wall of the hollow body 2 against the wall thereof. The packing or sealing ring contacts the wall of the cylinder only along one face or wall as shown in Figure 1. The periphery of the ring is free of contact with the cylinder or any mechanical part thereof. The bore of the ring 4 is in the form of a revolution surface with a curvilinear, for instance an elliptic or parabolic generatrix. In construction, the smaller diameter of the bore, which is flush with the middle ring plane, is made substantially of the same size as the diameter of the shaft I, so that light contact between the ring and shaft takes place on assembly along a line. A metallic washer 5 is fitted on the shaft I and is pressed against the resilient ring 4, for instance by the helical spring 6 bearing on any suitable part of the hollow body. For packing purposes the spring 6 causes the packing 4 to contact against the inner wall of the hollow body 2, and produces an initial pressure in an axial direction on the resilient ring 4 which results in a slight pressure of the ring at the bore thereof against the shaft I, so that a tight seal is ensured even when the fluid pressure within the hollow body 2 is very low.

On rise of the pressure within the hollow body 2, an axial pressure is set up on the ring 4, which is added to the pressure of the spring 6, and a radial pressure directed towards the shaft I, as shown by the arrows in Fig. 3, is also set up. The fluid pressure further affects about half the surface of the bore in the packing 4, more particularly the bore half near the inside of the body, opposing the deformation produced by the radial pressure directed towards the shaft 1, whereby the ring is prevented on the said bore half from coming into contact with the shaft 1, while the fluid pressure cannot be transmitted to the other bore half, so that the ring is deformed and comes into contact with the shaft. This ensures a tight seal under pressure and a sufficient contact surface between the bore in the ring and the shaft, while the friction on displacement of the shaft is limited to half the ring surface even under the highest pressures within the body.

As soon as the fluid pressure in the body 2 sinks, the resilient ring 4 automatically collapses, reducing contact with the shaft and sliding friction thereon. Moreover, on account of the shape of the bore in the ring, when the fluid enclosed in the body is oil or other lubricating fluid, the sliding surfaces are kept greased in operation, thereby reducing friction. Since the ring 4 is floating instead of being fixed as usual, its life will be practically unlimited.

What I claim is:

1. In a hydraulic pressure transmission system, a compression chamber with an end wall having an opening therein, a shaft reciprocable through said opening, an expansible sealing ring for the shaft, the bore of said ring being formed with a revolution surface having a curvilinear generatrix, said bore being in static contact with said shaft substantially along a line formed by the apex of said curved surface, the ring contacting said chamber only along one face thereof, the remaining surfaces of said ring being free of contact with said chamber, means for applying axial mechanical pressure to said ring to maintain a seal under static conditions, said ring being yieldably supported on said shaft by said pressure means and being further subjected to axial and radial pressure upon the application of hydraulic pressure in said chamber, the area of contact surface between said bore and shaft increasing upon the application of said pressure against said ring in proportion to the increase of said pressure under dynamic conditions, the portion of the bore of said ring adjacent said chamber wall flowing into contact with said shaft under said pressures and flowing with the movement of the shaft into the opening in said wall to effect a seal between said shaft and said opening.

2. A device as claimed in claim 1, in which said ring contracts to its initial condition of substantially line contact with said shaft upon release of hydraulic pressure, whereby frictional engagement between the ring and shaft is reduced upon return movement of said shaft.

3. In a hydraulic pressure transmission system, a compression chamber with an end wall having an opening therein, a shaft reciprocable through said opening, an expansible sealing ring on said shaft at said opening, said ring contacting said chamber only along one face thereof, the remaining surfaces thereof being free of contact with said chamber, the bore of said ring being formed with a revolution surface having a curvilinear generatrix, said bore being in static contact with said shaft substantially along a line formed by the apex of said curved surface, the ring being subjected to axial and radial hydraulic pressure upon the application of pressure in said chamber, the portions of the bore adjacent the side walls of the ring being spaced from the shaft under static conditions, that portion of the bore adjacent the face of the ring in contact with the chamber being expanded progressively into contact with said shaft under dynamic conditions in proportion to the increase in the application of hydraulic pressure within said chamber, the portion of the bore adjacent the other face of the ring being spaced from the shaft and filled with the fluid in the chamber under dynamic conditions to prevent contact with the shaft, thereby lessening the area of contact of said ring with said shaft to reduce friction.

PHILIP SIDNEY BALDWIN.

REFERENCES CITED

The following references are of record in the file of this patent:

UNITED STATES PATENTS

| Number | Name | Date |
|---|---|---|
| 382,187 | Pinch | May 1, 1888 |
| 1,142,642 | Van Maanen | June 8, 1915 |
| 1,732,538 | Robertshaw | Oct. 22, 1929 |
| 1,986,285 | Pollitz | Jan. 1, 1935 |
| 2,182,034 | Von Oberstadt | Dec. 5, 1939 |
| 2,360,732 | Smith | Oct. 17, 1944 |
| 2,386,873 | Mercier | Oct. 16, 1945 |
| 2,401,379 | Smith | June 4, 1946 |

FOREIGN PATENTS

| Number | Country | Date |
|---|---|---|
| 606,218 | France | of 1926 |
| 451,385 | Germany | of 1927 |
| 412,774 | Italy | of 1946 |